United States Patent
Carnegie

[11] Patent Number: 5,967,266
[45] Date of Patent: Oct. 19, 1999

[54] BRAKE ADJUSTMENT MONITORING SYSTEM

[76] Inventor: Douglas R. Carnegie, 7015 Centennial Dr., Box 2272 Sardis, British Columbia, Canada, V2R 1A6

[21] Appl. No.: 08/883,589

[22] Filed: Jun. 26, 1997

[51] Int. Cl.$^6$ ................................................. F16D 66/02
[52] U.S. Cl. ...................... 188/1.11 L; 340/454; 303/20
[58] Field of Search .................... 188/1.11 R, 1.11 W, 188/1.11 L, 1.11 E; 73/121, 129; 340/454; 116/208; 192/30 W; 303/20; 324/207.2, 207.24, 207.26

[56] References Cited

U.S. PATENT DOCUMENTS

| | | | |
|---|---|---|---|
| 2,873,436 | 2/1959 | Avrea | 188/1.11 L |
| 3,776,329 | 12/1973 | Hope | 188/1.11 L |
| 4,440,279 | 4/1984 | Schreiner | 188/1.11 L |
| 4,964,679 | 10/1990 | Rath | 303/20 |
| 5,226,509 | 7/1993 | Smith | 188/1.11 W |
| 5,285,190 | 2/1994 | Humphreys et al. | 188/1.11 L |
| 5,310,023 | 5/1994 | Martinez | 188/1.11 L |
| 5,358,075 | 10/1994 | Jarzombek | 188/1.11 L |
| 5,433,296 | 7/1995 | Webberley | 188/1.11 L |
| 5,450,930 | 9/1995 | Martens et al. | 188/1.11 L |
| 5,572,187 | 11/1996 | Williford | 188/1.11 E |
| 5,753,807 | 5/1998 | Trueman et al. | 73/121 |
| 5,791,441 | 8/1998 | Matos et al. | 188/1.11 L |
| 5,825,287 | 10/1998 | Zarybnicky et al. | 188/1.11 W |

*Primary Examiner*—Douglas C. Butler

[57] ABSTRACT

A brake adjustment monitoring system for displaying the status of the brake adjustment of each of the vehicle's brakes and warning the vehicle operator of a serious maladjustment. The inventive device includes a push rod movement measuring device coupled to each push rod for providing a first signal representative of the linear motion of the push rod to a first position and a second signal representative of the linear motion of the push rod to a second position, the first and second positions indicating successively greater linear motion of the push rod and thereby representing greater degrees of maladjustment of each brake, an alarm, a display and an electronic switch operably coupled to the push rod movement measuring device for providing the first and second signals to a microcontroller, the microcontroller for processing the first and second signals, for providing an alarm signal to the alarm and for providing a display signal to the display.

12 Claims, 7 Drawing Sheets

BRAKE ADJUSTMENT MONITORING SYSTEM

BACKGROUND OF THE INVENTION

1. Field of the Invention

The present invention relates to vehicle brake adjustment monitoring systems and more particularly pertains to a new Brake Adjustment Monitoring System for displaying the status of the brake adjustment of each of a vehicle's brakes and warning the vehicle operator of a serious maladjustment.

2. Description of the Prior Art

The use of vehicle brake adjustment monitoring systems is known in the prior art. More specifically, vehicle brake adjustment monitoring systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle brake adjustment monitoring systems include U.S. Pat. No. 5,226,509; U.S. Pat. No. 4,879,964; U.S. Pat. No. 4,776,438; U.S. Pat. No. 5,339,069; U.S. Pat. No. 4,855,712 and U.S. Pat. No. 4,642,603.

While these devices fulfill their respective, particular objectives and requirements, the aforementioned patents do not disclose a new Brake Adjustment Monitoring System. The system is for use with a vehicle having an air brake system including a plurality of air chambers, each air chamber being secured to an undercarriage of the vehicle by an air chamber mounting bracket such that it is stationary with respect thereto, the air brake system further including a plurality of push rods having a threaded extension at one end thereof, the push rods being movable with respect to the undercarriage and extending from each air chamber for linear motion with respect thereto, and a braking mechanism including a slack adjuster operably connected to each push rod threaded extension through a push rod clevis. The inventive device includes a push rod movement measuring means coupled to each push rod for providing a first signal representative of the linear motion of the push rod to a first position and a second signal representative of the linear motion of the push rod to a second position, the first and second positions indicating successively greater linear motion of the push rod and thereby representing greater degrees of maladjustment of each brake, an alarm means, a display means and a switching means operably coupled to the push rod movement measuring means for providing the first and second signals to a controller means, the controller means for processing the first and second signals, for providing an alarm signal to the alarm means and for providing a display signal to the display means.

In these respects, the Brake Adjustment Monitoring System according to the present invention substantially departs from the conventional concepts and designs of the prior art, and in so doing provides an apparatus primarily developed for the purpose of displaying the status of the brake adjustment of each of the vehicle's brakes and warning the vehicle operator of a serious maladjustment.

SUMMARY OF THE INVENTION

In view of the foregoing disadvantages inherent in the known types of vehicle brake adjustment monitoring systems now present in the prior art, the present invention provides a new Brake Adjustment Monitoring System construction wherein the same can be utilized for displaying the status of the brake adjustment of each of the vehicle's brakes and warning the vehicle operator of a serious maladjustment.

The general purpose of the present invention, which will be described subsequently in greater detail, is to provide a new Brake Adjustment Monitoring System apparatus and method which has many of the advantages of the vehicle brake adjustment monitoring systems mentioned heretofore and many novel features that result in a new Brake Adjustment Monitoring System which is not anticipated, rendered obvious, suggested, or even implied by any of the prior art vehicle brake adjustment monitoring systems, either alone or in any combination thereof.

To attain this, the present invention generally comprises a push rod movement measuring means coupled to each push rod for providing a first signal representative of the linear motion of the push rod to a first position and a second signal representative of the linear motion of the push rod to a second position, the first and second positions indicating successively greater linear motion of the push rod and thereby representing greater degrees of maladjustment of each brake, an alarm means, a display means and a switching means operably coupled to the push rod movement measuring means for providing the first and second signals to a controller means, the controller means for processing the first and second signals, for providing an alarm signal to the alarm means and for providing a display signal to the display means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Brake Adjustment Monitoring System apparatus and method which has many of the advantages of the vehicle brake adjustment monitoring systems mentioned heretofore and many novel features that result in a new Brake Adjustment Monitoring System which is not anticipated, rendered obvious, suggested, or even implied by any of the prior art vehicle brake adjustment monitoring systems, either alone or in any combination thereof.

It is another object of the present invention to provide a new Brake Adjustment Monitoring System which may be easily and efficiently manufactured and marketed.

It is a further object of the present invention to provide a new Brake Adjustment Monitoring System which is of a durable and reliable construction.

An even further object of the present invention is to provide a new Brake Adjustment Monitoring System which is susceptible of a low cost of manufacture with regard to both materials and labor, and which accordingly is then susceptible of low prices of sale to the consuming public, thereby making such Brake Adjustment Monitoring System economically available to the buying public.

Still yet another object of the present invention is to provide a new Brake Adjustment Monitoring System which provides in the apparatuses and methods of the prior art some of the advantages thereof, while simultaneously overcoming some of the disadvantages normally associated therewith.

Still another object of the present invention is to provide a new Brake Adjustment Monitoring System for displaying the status of the brake adjustment of each of the vehicle's brakes and warning the vehicle operator of a serious maladjustment.

Yet another object of the present invention is to provide a new Brake Adjustment Monitoring System which includes a push rod movement measuring means coupled to each push rod for providing a first signal representative of the linear motion of the push rod to a first position and a second signal representative of the linear motion of the push rod to a second position, the first and second positions indicating successively greater linear motion of the push rod and thereby representing greater degrees of maladjustment of each brake, an alarm means, a display means and a switching means operably coupled to the push rod movement measuring means for providing the first and second signals to a controller means, the controller means for processing the first and second signals, for providing an alarm signal to the alarm means and for providing a display signal to the display means.

Still yet another object of the present invention is to provide a new Brake Adjustment Monitoring System that allows trucking companies to avoid unnecessary accidents and their resulting injuries.

Even still another object of the present invention is to provide a new Brake Adjustment Monitoring System that prevents truck operators from traveling with air brakes that are out of adjustment by providing the truck operators with a clear signal of brake maladjustment.

Even still another object of the present invention is to provide a new Brake Adjustment Monitoring System that allows for easy inspection of the condition of a vehicle's brakes by police and other safety officials by providing for displays outside of the vehicle's cab.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 6 thereof, a new Brake Adjustment Monitoring System embodying the principles and concepts of the present invention and generally designated by the reference numeral 10 will be described.

More specifically, it will be noted that the Brake Adjustment Monitoring System 10 comprises a push rod movement measuring means coupled to each push rod 14, an alarm means such as buzzer 69 and warning light 68, a display means such as first display means 40 and a switching means such as multiplexers 61 and 76 coupled to the push rod movement measuring means for providing signals to a controller means such as microcontroller 60 for processing the signals received from the switching means and for providing an alarm signal to the alarm means and for providing a display signal to the display means.

Figure 1:
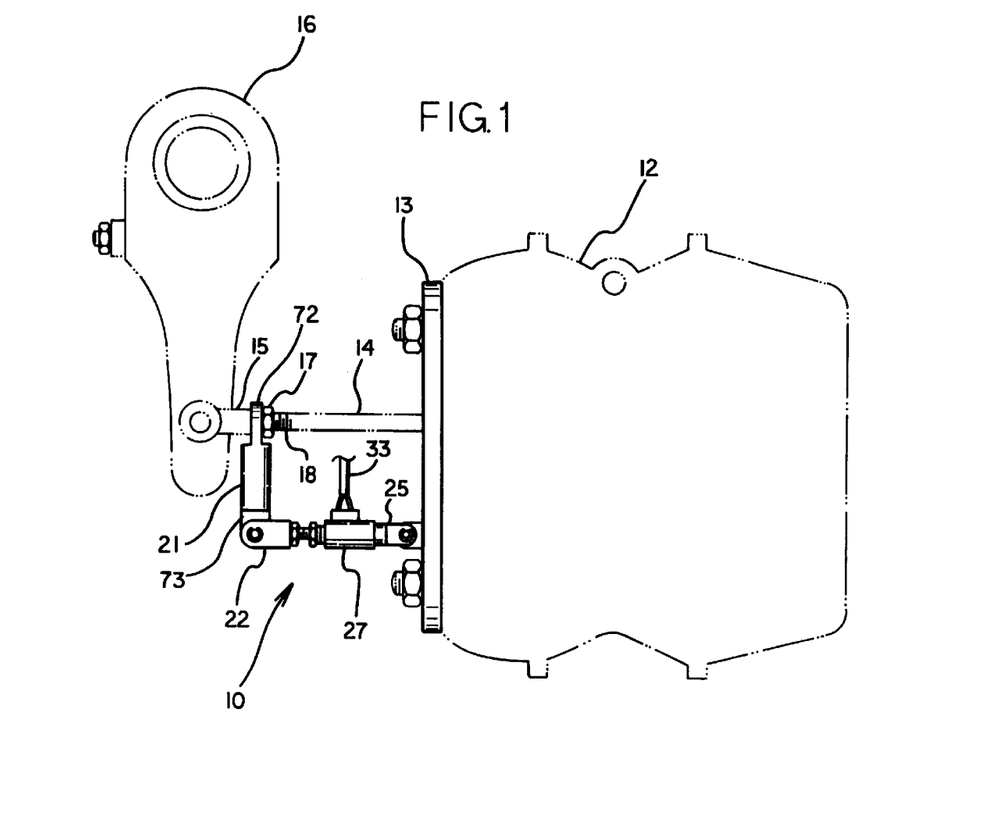
FIG. 1 is a plan view of a new Brake Adjustment Monitoring System according to the present invention.

With reference to FIG. 1 there is shown the push rod movement measuring means of the new Brake Adjustment Monitoring System mounted to the air brake mounting bracket 13 which is shown attached to an air brake chamber 12. Also shown is a push rod 14 having a push rod threaded extension 18 at one end, the push rod threaded extension 18 being threadingly attachable to a push rod clevis 15 which attaches to a slack adjuster 16. A threaded nut 17 is shown for securing an attachment bracket first end 72 to the push rod threaded extension 18.

Figure 2:
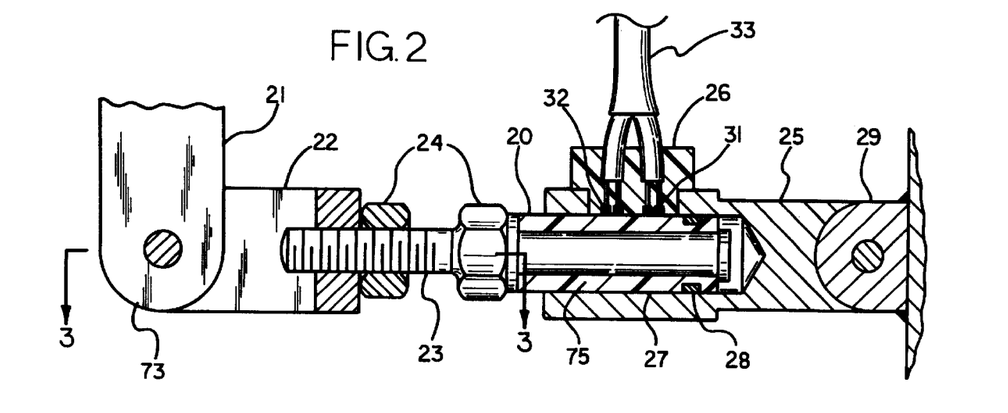
FIG. 2 is a fragmented cross sectional view thereof.
Figure 3:
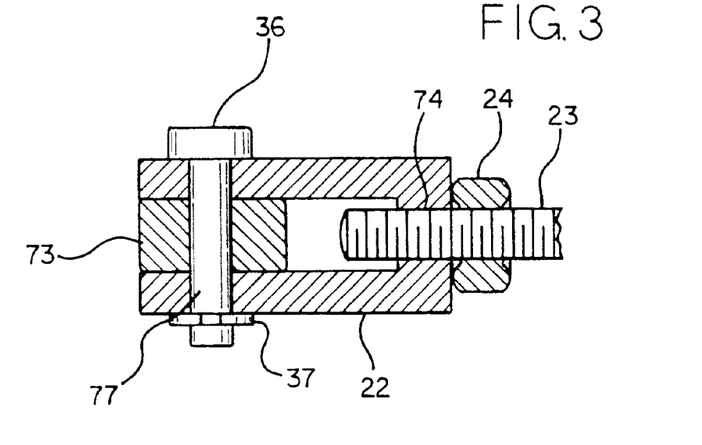
FIG. 3 is a cross sectional view taken along line 3—3 of FIG. 2.

With reference to FIG. 2 the attachment bracket second end 73 is shown pivotally attached to a U-shaped connecting bracket 22. The connecting bracket 22 is pivotally attached to the attachment bracket second end 73 by means of a pin 34 and snap ring 37, the pin 34 being receivable through a bore 77 formed in the attachment bracket second end 73 (FIG. 3). With continued reference to FIG. 3 there is shown a threaded bore 74 formed in the connecting bracket 22. The threaded bore 74 threadingly and adjustably receives a threaded extension 23 formed at one end of a movable member 20. An adjustment nuts 24 are shown for securing the threaded extension 23 in position (FIG. 2).

With continued reference to FIG. 2 movable member 20 is shown including a cylindrical sliding portion 75 slidingly disposed within an extension bracket cylinder 27. A contact block 26 formed of non-conducting material is shown disposed in an extension bracket 25 as by pressure fitting. Shown disposed within the contact block 26 are a first pair of contacts 31 and a second pair of contacts 32, the first pair of contacts 31 and the second pair of contacts 32 being disposed in such manner as to make sliding contact with the cylindrical sliding portion 75, the cylindrical sliding portion 75 also behind formed of non-conducting material.

A contact ring 28 is shown formed at one end of the cylindrical sliding portion 75. Upon contact of the contact ring 28 with the first pair of contacts 31 (FIG. 5), a first signal is sent to the switching means as discussed hereinafter. In similar fashion, upon contact of the contact ring 28 with the second pair of contacts 32, a second signal is sent to the switching means. Cable 33, formed of a material able to resist environmental conditions, is shown disposed within the contact block 26.

Figure 4:
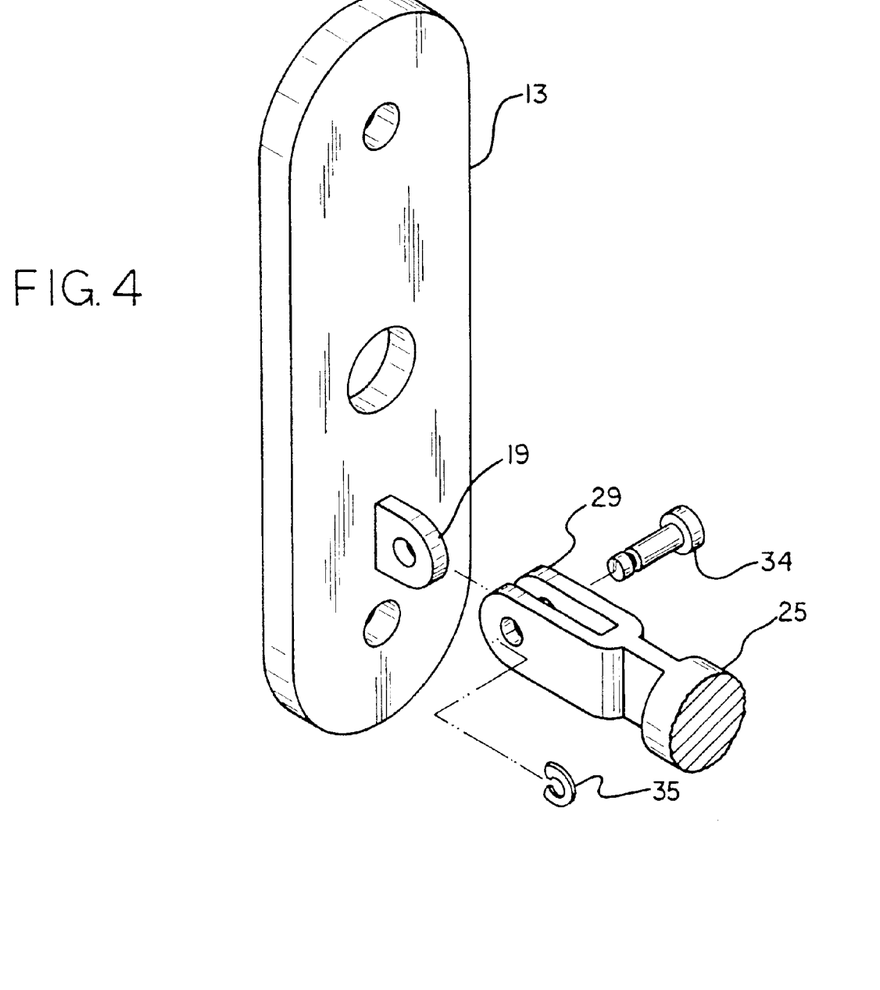
FIG. 4 is an exploded view showing the air brake mounting bracket and the means for attaching the mounting bracket to the air brake mounting bracket.
Figure 5:
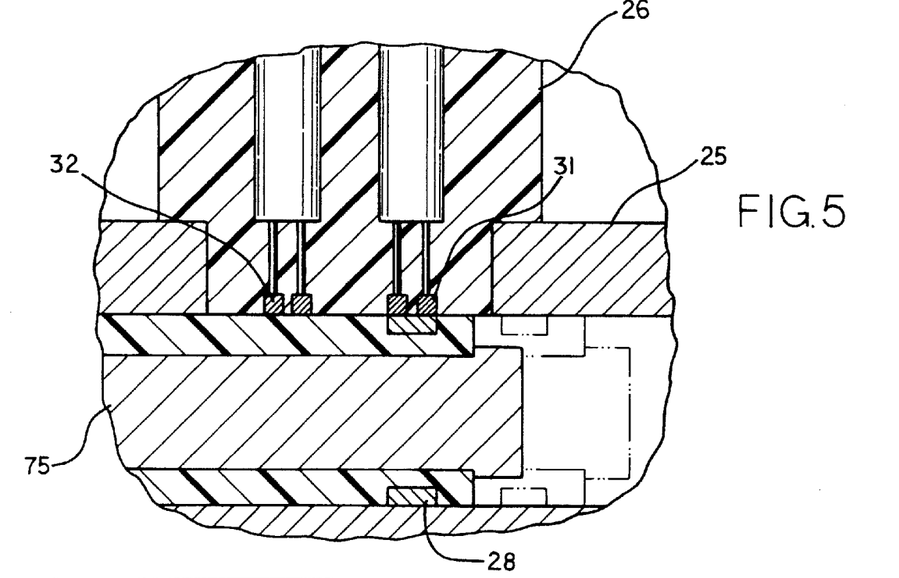
FIG. 5 is a fragmented cross sectional view showing a first contact pair in contact with a contact ring.

With continued reference to FIG. 2 the extension bracket 25 is shown having a U-shaped clamp 29 pivotally attached to an air brake mounting bracket support 19 by means of pin 34 and snap ring 35 (FIG. 4).

Figure 10:
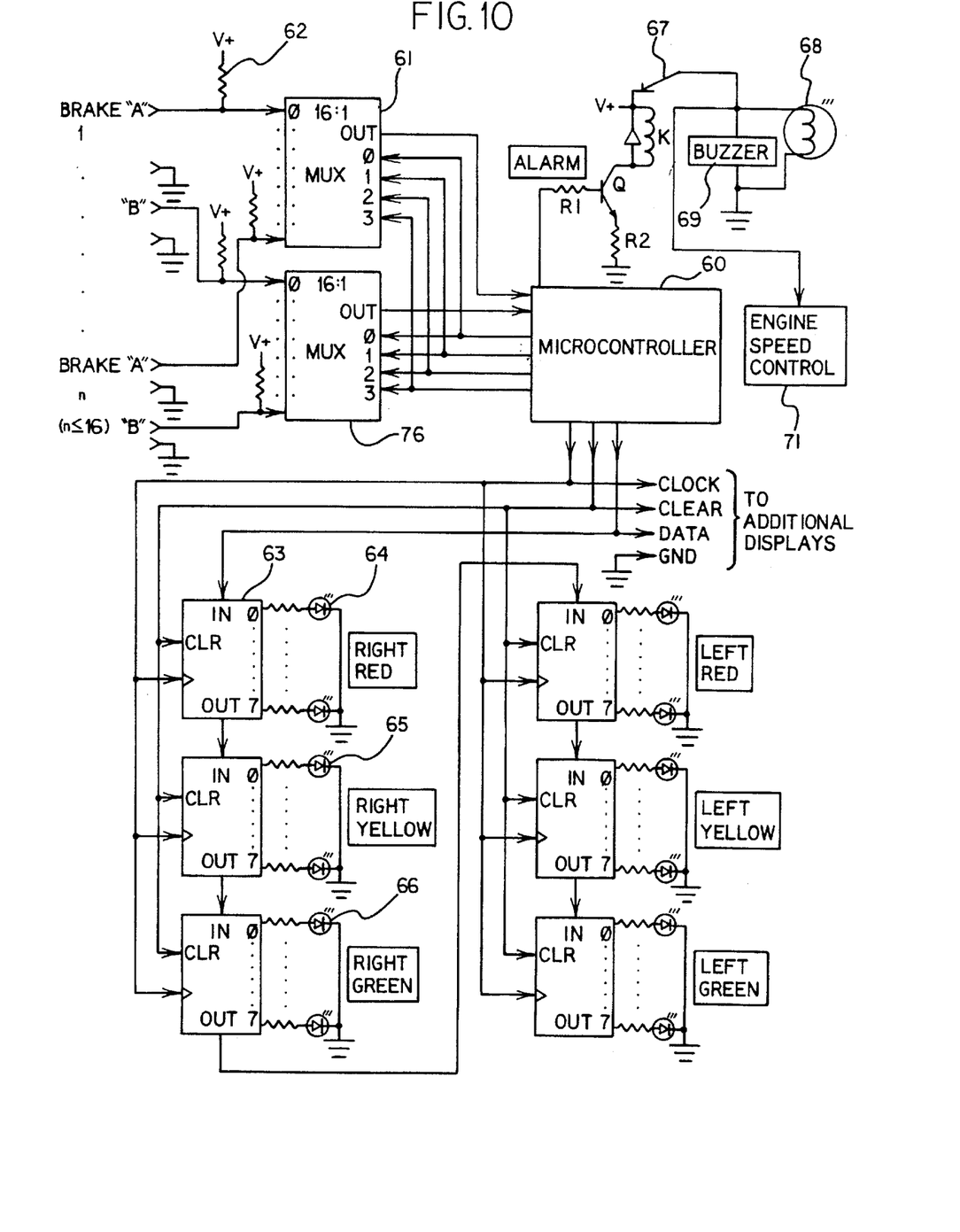
FIG. 10 is a schematic diagram showing the main circuit of the present invention.

With reference to FIG. 10 a first 16:1 multiplexer 61 is shown having as inputs a plurality of first contacts pairs 31, which in the preferred embodiment include eight inputs from the brakes on the right side of the vehicle and eight inputs from the brakes on the left side of the vehicle. A second 16:1 multiplexer 76 is shown having as inputs a plurality of second contacts pairs 32, which in the preferred embodiment include eight inputs from the brakes on the right side of the vehicle and eight inputs from the brakes on the left side of the vehicle.

The inputs to the first and second multiplexers 61 and 76 respectively are held high by pull-up resistors 62. Upon the closing of the contact pairs 31 or 32, the inputs go low. The multiplexers 61 and 76 are polled by the microprocessor 60 running at one MHz and in this manner the extent of linear travel of the push rods 14 is monitored.

After polling the multiplexers 61 and 76, a data bit is output to a plurality of shift registers 63 shown connected in series. The first data bit is high if the condition of the eighth brake on the left side of the vehicle is such that neither the first pair of contacts 31 or the second pair of contacts 32 have been closed upon application of the brakes. The first data bit is low if either of the first pair of contacts 31 or the second pair of contacts 32 have been closed. In similar fashion the next seven data bits indicate whether or not any of the cylindrical sliding portions 75, and by a one-to-one correspondence, the push rods 14, on the left side of the vehicle have moved sufficiently enough to close the first pair of contacts 31 or the second pair of contacts 32.

The next eight data bits indicate if any of the push rods 14 on the left side of the vehicle have moved sufficiently enough to close the first pair of contacts 31. In the event that the first pair of contacts 31 have been closed, the data bit is high, otherwise it is low.

The next eight data bits indicate if any of the push rods 14 on the left side of the vehicle have moved sufficiently enough to close the second pair of contacts 32. In the event that the second pair of contacts 32 have been close, the data bit is high, otherwise it is low.

In like manner, the following 24 bits serve to indicate the extent of push rod 14 travel for the brakes on the right side of the vehicle.

As shown in FIG. 10 a high data bit energizes a light emitting diode, the color of which depends upon the extent of linear motion of the push rod 14. A green light emitting diode 66 indicates that the push rod 14 has not traveled sufficiently to close the first pair of contacts 31 or the second pair of contacts 32. A yellow light emitting diode 65 indicates that the push rod 14 has traveled sufficiently to close the first pair of contacts 31. A red light emitting diode 64 indicates that the push rod 14 has traveled sufficiently to close the second pair of contacts 32. Each shift register 63 is shown having associated therewith eight light emitting diodes of a single color, the color reflecting, the extent of push rod 14 travel for each of the eight brakes on each side of the vehicle.

As well known in the art, the location of the first pair of contacts 31 and the second pair of contacts 32 can be selected in such manner that closing the first pair of contacts 31 serves as a warning to the operator of the vehicle of wear of the brakes and that closing the second pair of contacts 32 serves as a warning to the operator of the vehicle that the brakes are dangerously maladjusted and in need of adjustment.

With continued reference to FIG. 10 there is shown an alarm circuit comprising a transistor Q biased by resistors R1 and R2 for energizing relay K. Upon the occurrence of the closing of any of the second contact pairs 32, the microprocessor 60 generates an alarm signal which turns on the transistor Q thereby closing contact arm 67. A voltage source is thereby connected to a buzzer 69 and a warning light 68, the buzzer 69 and warning light 68 preferably being disposed in the cab of the vehicle to alert the operator of the vehicle. Additionally, for vehicles so equipped, the same alarm signal can serve as a speed control signal to a vehicle engine speed control means 71 to slow the vehicle so that the operator can make appropriate adjustments to the brake in need thereof.

Figure 6:
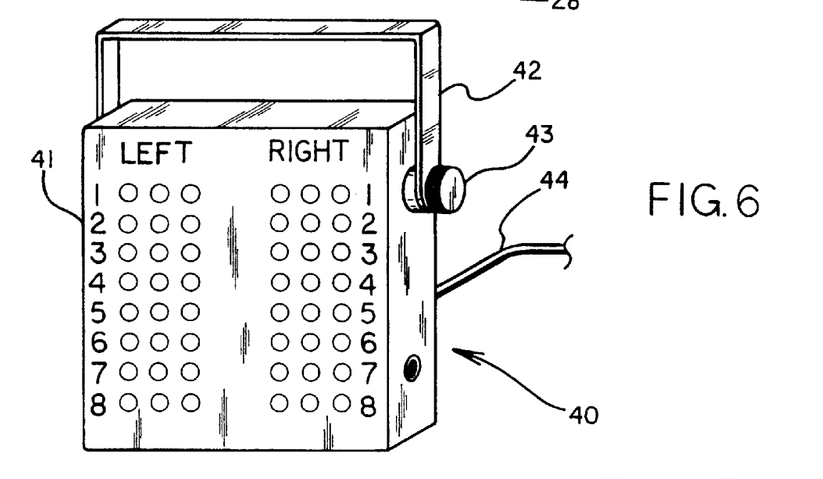
FIG. 6 is a right side perspective view showing a display of the present invention.
Figure 7:
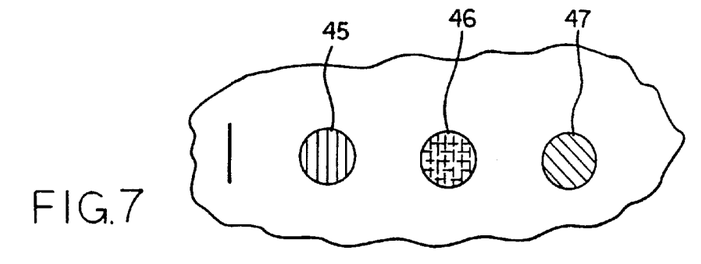
FIG. 7 is a fragmented view showing three different colored indicator lights of the display of the present invention.

With reference to FIG. 6 there is shown a cab display 40 of the present invention including a housing 41 having a handle 42 adjustable by means of adjustment knob 43. A cable 44 connects the LEDs disposed in the cab display 40 to the logic circuitry disposed in a control module (not shown). As shown in FIG. 7, for each brake on the left and right sides of the vehicle there is a corresponding row of LEDs including a red LED 45, a yellow LED 46 and a green LED 47.

Figure 8:
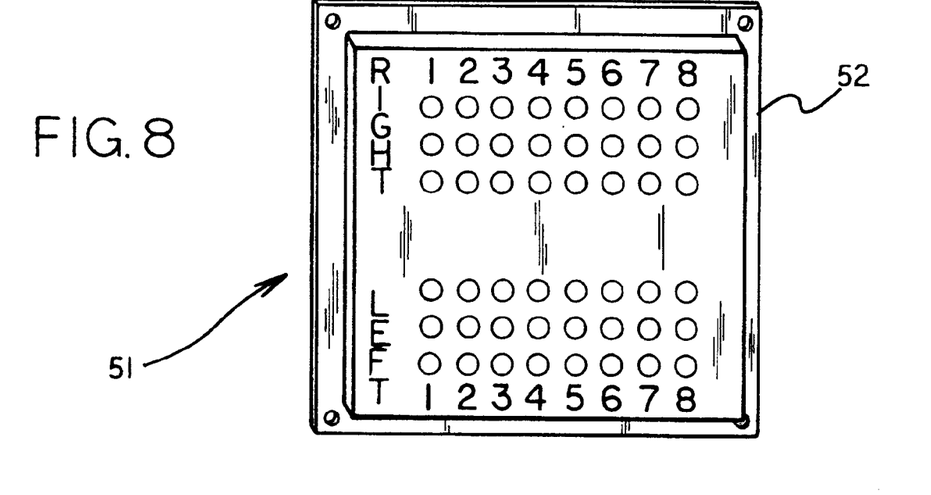
FIG. 8 is a plan view showing the driver's side outside display.
Figure 9:
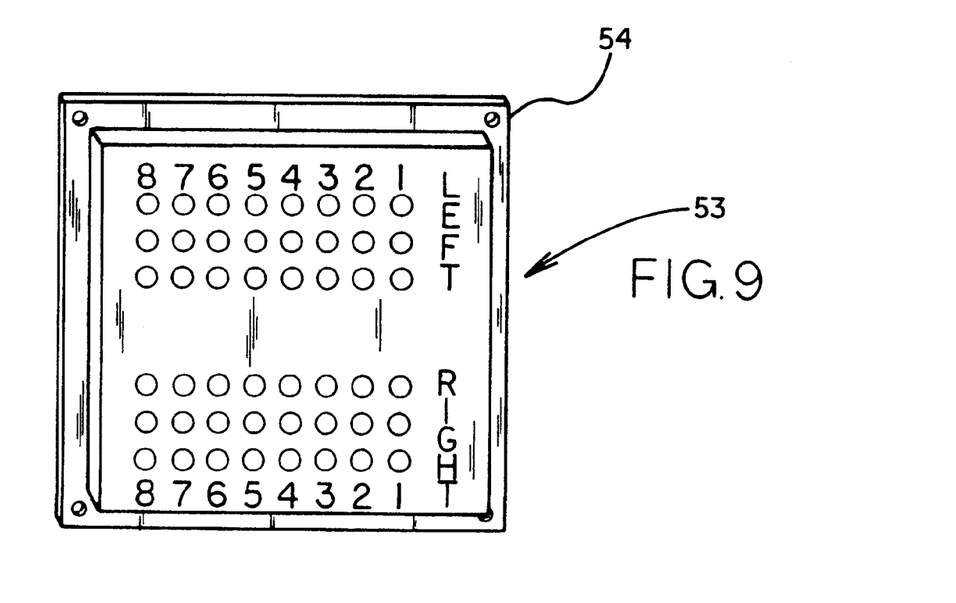
FIG. 9 is a plan view showing the passenger's side outside display.

With reference to FIGS. 8 and 9 there is shown a driver's side outside display 51 and a passenger's side outside dispaly 53. Each outside display includes a means for mounting the display such as mounting brackets 52 and 54.

Figure 11:
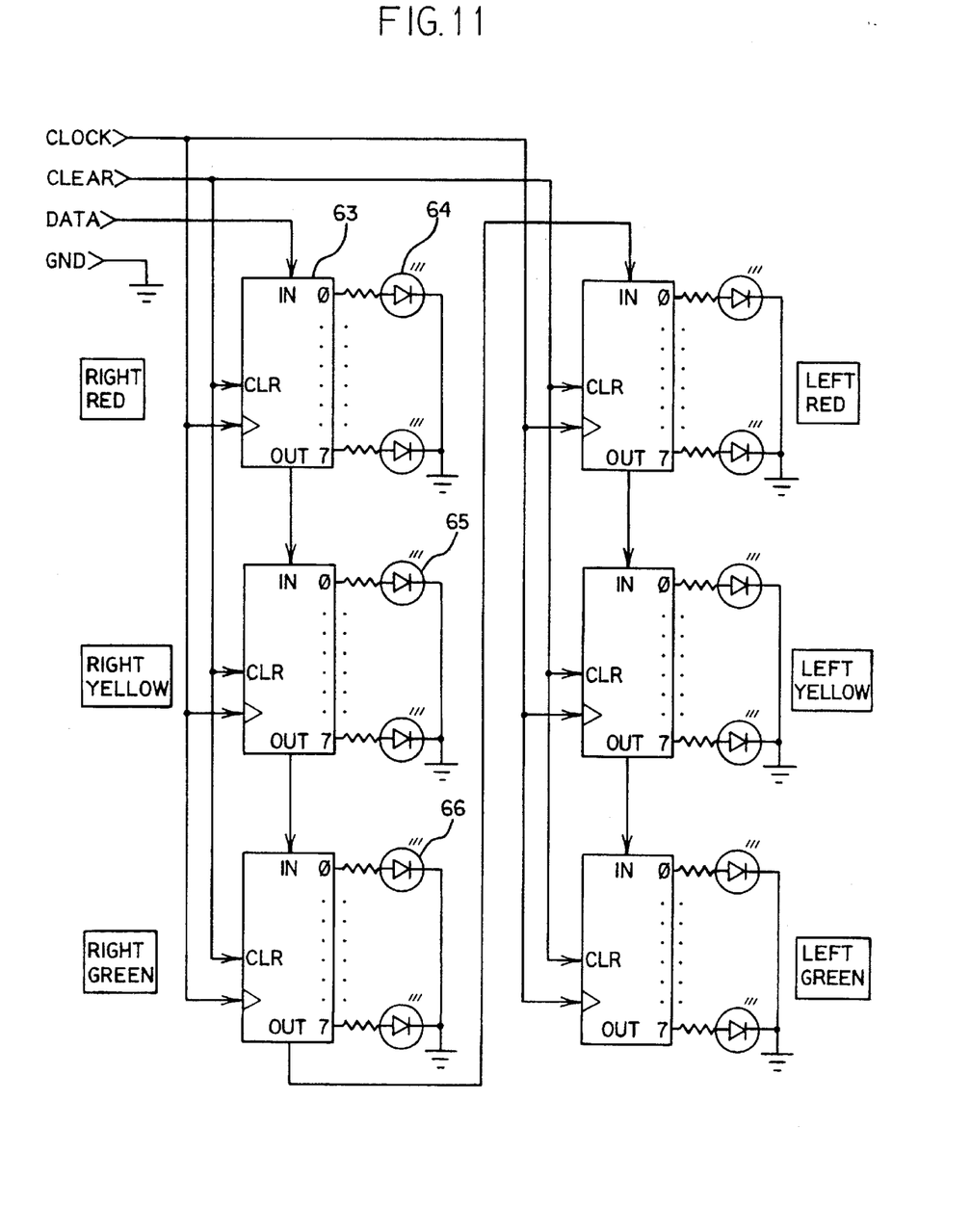
FIG. 11 is a schematic diagram showing the circuit for activating the indicator lights of the outside displays.

With reference to FIG. 11 there is shown circuitry substantially similar to that shown in FIG. 10 for energizing a plurality of green LEDs 66, yellow LEDs 65 and red LEDs 64 by means of a plurality of shift registers 63 connected in series and operably connected to the microprocessor 60. Each outside display 51 and 53 has associated therewith the circuit of FIG. 11 for energizing the LEDs in response to the data output of the microprocessor 60.

Figure 12:
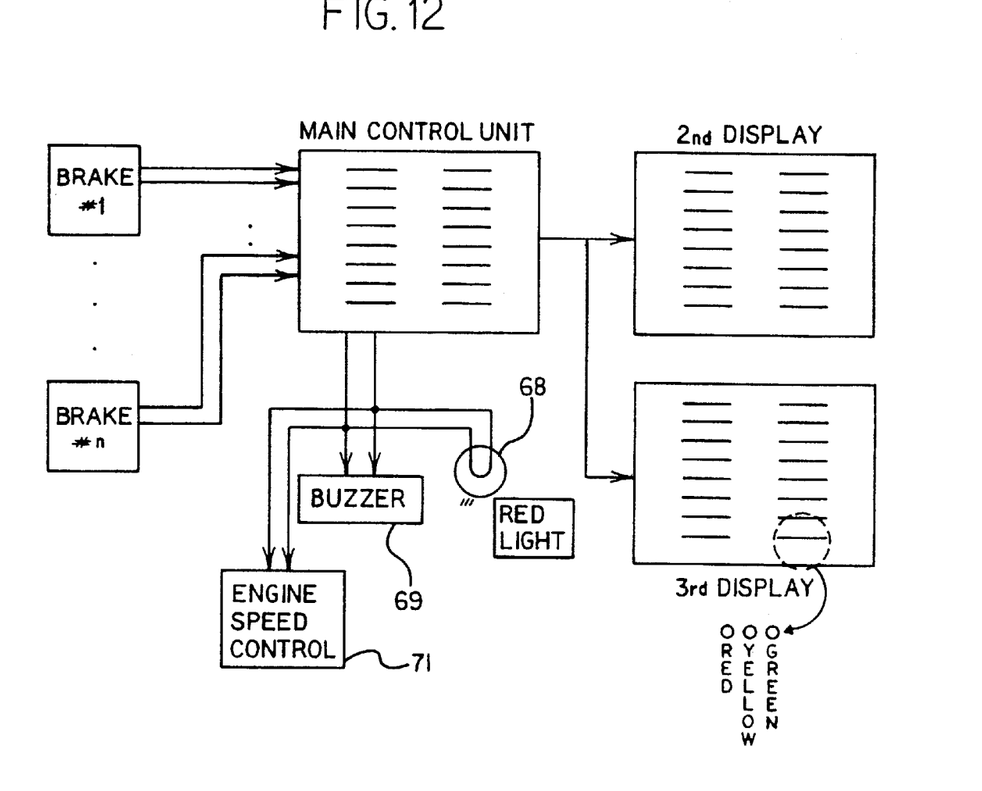
FIG. 12 is a block diagram showing the flow of information between functional units.

With reference to FIG. 12 there is shown an alternative embodiment of the present invention wherein the logic control circuitry is disposed within the cab display.

Figure 13:
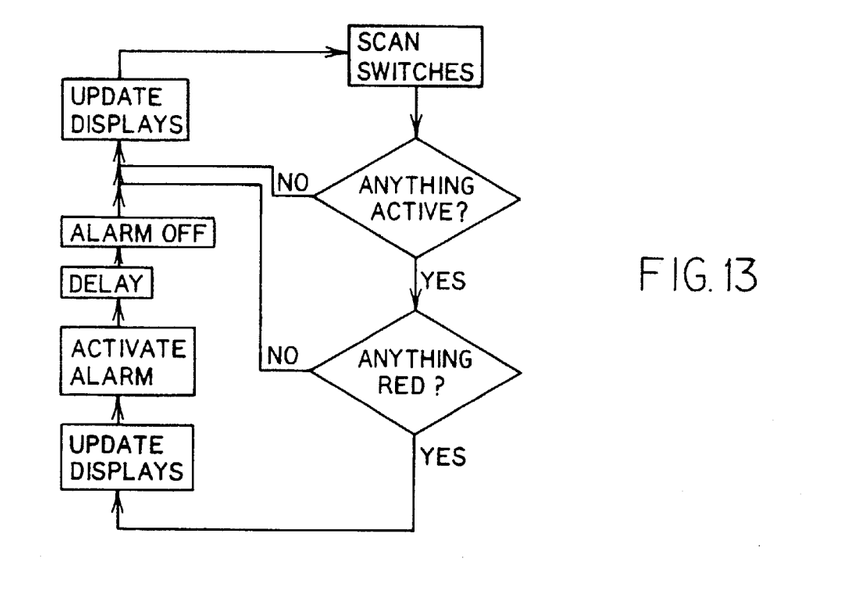
FIG. 13 is flow diagram illustrating the programming of the microcontroller as it is used to process the information received from the switching means and send information to the displays and warning devices.

With reference to FIG. 13 there is shown a flow diagram illustrating the programming of the microcontroller 60. The microcontroller 60 scans the multiplexers 61 and 75 and continually updates the displays. In the event of the condition that a second pair of contacts 32 have been closed, the displays are updated and additionally the alarm signal is generated. A delay is interposed at this point to give the operator of the vehicle an opportunity to react to the alarm. The alarm signal is then turned off and the process is repeated.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A brake adjustment monitoring system for use with a vehicle having an air brake system including a plurality of air chambers, each air chamber being secured to an undercarriage of the vehicle by an air chamber mounting bracket such that it is stationary with respect thereto, the air brake system further including a plurality of push rods having a threaded extension at one end thereof, the push rods being movable with respect to the undercarriage and extending from each air chamber for linear motion with respect thereto, and a braking mechanism including a slack adjuster operably connected to each push rod threaded extension through a push rod clevis, the improvement comprising:

a push rod movement measuring means coupled to each push rod for providing a first signal representative of the linear motion of the push rod to a first position and a second signal representative of the linear motion of the push rod to a second position, the first and second positions indicating successively greater linear motion of the push rod;

an alarm means;

a first display means for receiving a first and a second electrical signal from the push rod movement measuring means, the first signal indicating that brakes of a vehicle are worn beyond a predetermined level, the second signal indicating that the brakes have worn to an unsafe level;

a switching means operably coupled to the push rod movement measuring means for providing the first and second signals to a controller means, the controller means for processing the first and second signals, for providing an alarm signal to the alarm means and for providing a display signal to the first display means; and the push rod movement measuring means further comprising an attachment bracket having first and second ends, the attachment bracket being attachable at the first end to the push rod threaded extension and extending perpendicularly therefrom, a connecting bracket pivotally attachable to the second end, the connecting bracket having a threaded bore at one end thereof, a movable member having a threaded extension and a cylindrical sliding portion, the threaded extension being adjustably receivable in the threaded bore and the cylindrical sliding portion being slidably receivable in an extension bracket cylinder, the extension bracket cylinder being formed in an extension bracket pivotally attachable to the air chamber mounting bracket, the cylindrical sliding portion further comprising a contact means disposed therearound for contacting a first pair of electrical contacts disposed in the extension bracket cylinder and generating the first signal and for contacting a second pair of electrical contacts disposed in the extension bracket cylinder and generating the second signal, wherein a width of the contact means is about equal to the distance between the first and second pair of electrical contacts.

2. The brake adjustment monitoring system of claim 1, wherein the threaded extension being threadably inserted through an adjustment nut, said adjustment nut being tightenable against the connecting bracket for preventing rotation of the movable member for permitting precise positioning of the contact means of the movable member with respect to the electrical contacts, a second adjustment nut being fixedly coupled to said movable member and adapted for receiving a tool therearound.

3. The brake adjustment monitoring system of claim 1, wherein the alarm means further comprise a buzzer and a warning light.

4. The brake adjustment monitoring system of claim 1, wherein the first display means further comprise an array of light emitting diodes comprising a column of green light emitting diodes, a column of yellow light emitting diodes and a column of red light emitting diodes, the yellow light emitting diodes being energized in the case of linear motion of the push rod to the first position, the red light emitting diodes being energized in the case of linear motion of the push rod to the second position, and the green light emitting diodes being energized in all other cases.

5. The brake adjustment monitoring system of claim 4, wherein the array of light emitting diodes further comprise a first array comprising a first column of green light emitting diodes, a first column of yellow light emitting diodes and a first column of red light emitting diodes and a second array comprising a second column of green light emitting diodes, a second column of yellow light emitting diodes and a second column of red light emitting diodes, the first array being representative of the linear motion of the push rods on a left side of the vehicle and the second array being representative of the linear motion of the push rods on a right side of the vehicle, the yellow light emitting diodes being energized in the case of linear motion of the push rod to the first position, the red light emitting diodes being energized in the case of linear motion of the push rod to the second position, and the green light emitting diodes being energized in all other cases.

6. The brake adjustment monitoring system of claim 5, wherein the display means further comprise a plurality of shift registers operably connected in series, a first shift register for energizing the first column of green light emitting diodes, a second shift register for energizing the first column of yellow light emitting diodes, a third shift register for energizing the first column of red light emitting diodes, a fourth shift register for energizing the second column of green light emitting diodes, a fifth shift register for energizing the second column of yellow light emitting diodes and a sixth shift register for energizing the second column of red light emitting diodes.

7. The brake adjustment monitoring system of claim 1, wherein the switching means further comprise a first and second multiplexer, the first multiplexer for receiving the first signal and the second multiplexer for receiving the second signal.

8. The brake adjustment monitoring system of claim 1, wherein the controller means further comprises a means for providing a speed control signal to a vehicle engine speed control means.

9. The brake adjustment monitoring system of claim 1, wherein the first display means is disposed within a cab of the vehicle.

10. The brake adjustment monitoring system of claim 1, further comprising a second display means disposed outside of a cab of the vehicle on the passenger's side thereof.

11. The of claim 1, further comprising a third display means disposed outside of a cab of the vehicle on the passenger's side thereof.

12. A brake adjustment monitoring system for use with a vehicle having an air brake system including a plurality of air chambers, each air chamber being secured to an undercarriage of the vehicle by an air chamber mounting bracket such that it is stationary with respect thereto, the air brake system further including a plurality of push rods having a threaded extension at one end thereof, the push rods being movable with respect to the undercarriage and extending from each air chamber for linear motion with respect thereto, and a braking mechanism including a slack adjuster operably connected to each push rod threaded extension through a push rod clevis, the improvement comprising:

a push rod movement measuring means coupled to each push rod for providing a first signal representative of the linear motion of the push rod to a first position and a second signal representative of the linear motion of the push rod to a second position, the first and second positions indicating successively greater linear motion of the push rod;

an alarm means;

a first display means for receiving a first and a second electrical signal from the push rod movement measuring means, the first signal indicating that brakes of a vehicle are worn beyond a predetermined level, the second signal indicating that the brakes have worn to an unsafe level;

a switching means operably coupled to the push rod movement measuring means for providing the first and second signals to a controller means, the controller means for processing the first and second signals, for providing an alarm signal to the alarm means and for providing a display signal to the first display means;

the push rod movement measuring means further comprise an attachment bracket having first and second ends, the attachment bracket being attachable at the first end to the push rod threaded extension and extending perpendicularly therefrom, a connecting bracket pivotally attachable to the second end, the connecting bracket having a threaded bore at one end thereof, a movable member having a threaded extension and a cylindrical sliding portion, the threaded extension being adjustably receivable in the threaded bore and the cylindrical sliding portion being slidably receivable in an extension bracket cylinder, the extension bracket cylinder being formed in an extension bracket pivotally attachable to the air chamber mounting bracket, the cylindrical sliding portion further comprising a contact means disposed therearound for contacting a first pair of electrical contacts disposed in the extension bracket cylinder and generating the first signal and for contacting a second pair of electrical contacts disposed in the extension bracket cylinder and generating the second signal, wherein a width of the contact means is about equal to the distance between the first and second pair of electrical contacts;

the threaded extension being threadably inserted through an adjustment nut, said adjustment nut being tightenable against the connecting bracket for preventing rotation of the movable member for permitting precise positioning of the contact means of the movable member with respect to the electrical contacts, a second adjustment nut being fixedly coupled to said movable member and adapted for receiving a tool therearound;

the alarm means further comprising a buzzer and a warning light;

the first display means further comprising an array of light emitting diodes comprising a column of green light emitting diodes, a column of yellow light emitting diodes and a column of red light emitting diodes, the yellow light emitting diodes being energized in the case of linear motion of the push rod to the first position, the red light emitting diodes being energized in the case of linear motion of the push rod to the second position, and the green light emitting diodes being energized in all other cases;

wherein the array of light emitting diodes further comprise a first array comprising a first column of green light emitting diodes, a first column of yellow light emitting diodes and a first column of red light emitting diodes and a second array comprising a second column of green light emitting diodes, a second column of yellow light emitting diodes and a second column of red light emitting diodes, the first array being representative of the linear motion of the push rods on a left side of the vehicle and the second array being representative of the linear motion of the push rods on a right side of the vehicle, the yellow light emitting diodes being energized in the case of linear motion of the push rod to the first position, the red light emitting diodes being energized in the case of linear motion of the push rod to the second position, and the green light emitting diodes being energized in all other cases;

wherein the switching means further comprise a first and second multiplexer, the first multiplexer for receiving the first signal and the second multiplexer for receiving the second signal wherein the controller means further comprises a means for providing a speed control signal to a vehicle engine speed control means;

wherein the display means further comprise a plurality of shift registers operably connected in series, a first shift register for energizing the first column of green light emitting diodes, a second shift register for energizing the first column of yellow light emitting diodes, a third shift register for energizing the first column of red light emitting diodes, a fourth shift register for energizing the second column of green light emitting diodes, a fifth shift register for energizing the second column of yellow light emitting diodes and a sixth shift register for energizing the second column of red light emitting diodes;

wherein the first display means is disposed within a cab of the vehicle;

a second display means disposed outside of a cab of the vehicle on the passenger's side thereof; and a third display means disposed outside of a cab of the vehicle on the passenger's side thereof.

* * * * *